US012730179B2

(12) United States Patent
Nguyen et al.

(10) Patent No.: US 12,730,179 B2
(45) Date of Patent: Sep. 8, 2026

(54) COMPUTER IMPLEMENTED METHOD FOR ESTIMATING INTERFERERS OF RADIOFREQUENCY SYSTEM, COMPUTER PROGRAM, AND DEVICE

(71) Applicant: MITSUBISHI ELECTRIC CORPORATION, Tokyo (JP)

(72) Inventors: Viet Hoa Nguyen, Rennes Cedex (FR); Nicolas Gresset, Rennes Cedex (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 356 days.

(21) Appl. No.: 18/277,459

(22) PCT Filed: Dec. 3, 2021

(86) PCT No.: PCT/JP2021/045432
§ 371 (c)(1),
(2) Date: Aug. 16, 2023

(87) PCT Pub. No.: WO2022/209030
PCT Pub. Date: Oct. 6, 2022

(65) Prior Publication Data
US 2024/0183931 A1 Jun. 6, 2024

(30) Foreign Application Priority Data
Mar. 31, 2021 (EP) .................................... 21305419

(51) Int. Cl.
*G01S 5/02* (2010.01)
*G01S 5/00* (2006.01)

(52) U.S. Cl.
CPC ............. *G01S 5/0278* (2013.01); *G01S 5/011* (2020.05); *G01S 5/02695* (2020.05)

(58) Field of Classification Search
None
See application file for complete search history.

(56) References Cited

U.S. PATENT DOCUMENTS

2015/0009072 A1* 1/2015 Nijsure ..................... G01S 5/28 342/417
2016/0124071 A1 5/2016 Baxley et al.

FOREIGN PATENT DOCUMENTS

JP 2020-41845 A 3/2020

OTHER PUBLICATIONS

Alnatheer et al., "Posterior Sampling for Opportunistic Spectrum Access with slow flat fading channels", 2015 IEEE 82nd Vehicular Technology Conference (VTC2015-FALL), IEEE, Sep. 6, 2015, pp. 1-5.

(Continued)

*Primary Examiner* — Whitney Moore
(74) *Attorney, Agent, or Firm* — Birch, Stewart, Kolasch & Birch, LLP

(57) ABSTRACT

A method comprising:

Obtaining observations Z_n, and building an observation vector Z=[Z_1, . . . , Z_n, . . . , Z_N], Defining a latent variable V_n, to build a vector of latent variables V=[V_1, . . . , V_n, . . . , V_N], and Implementing a Dirichlet process involving a Gibbs sampling with a Markov chain, the sampling being repeated as follows until convergence:

For n−1, . . . , N, if the observation Z_n is associated to a source, remove observation Z_n from a source corresponding to latent variable V_n, and retrieve a position posterior of this source as the observation Z_n is belonging to this source;

Draw a new value of latent variable V_n, based on a conditional probability;

Associate the observation Z_n to the source, and update the posterior distribution of the position for the source, (Continued)

and, upon convergence of the algorithm, operating a separation of the interfering sources into K independent measurement sets, and an estimation of each source position.

14 Claims, 9 Drawing Sheets

(56) References Cited

OTHER PUBLICATIONS

International Search Report (PCT/ISA/210) issued in PCT/JP2021/045432, dated Mar. 25, 2022.
Written Opinion of the International Searching Authority (PCT/ISA/237) issued in PCT/JP2021/045432, dated Mar. 25, 2022.

* cited by examiner

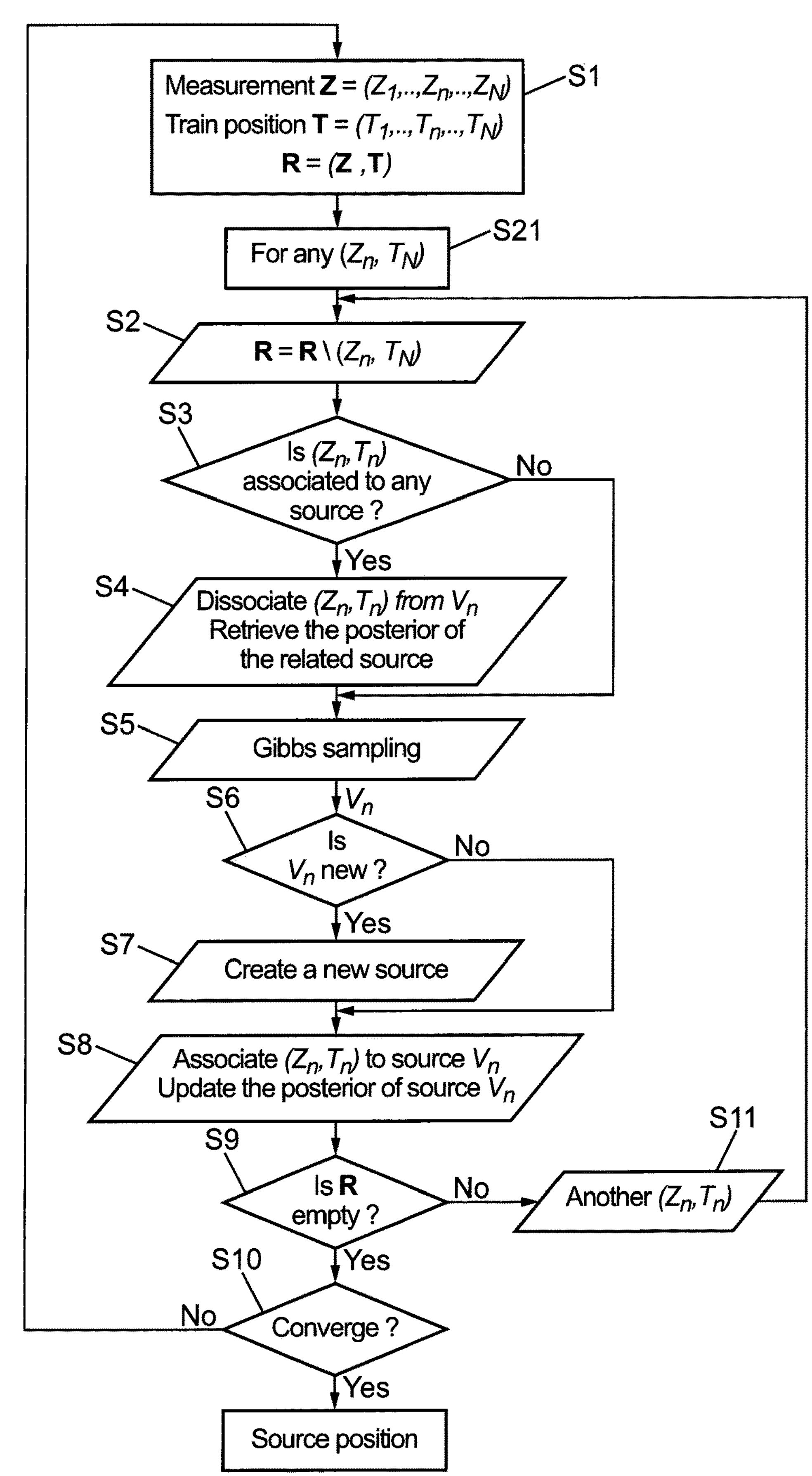
FIG. 8
Measurement Z = (Z1,..,Zn,..,ZN)
Train position T = (T1,..,Tn,..,TN)
R = (Z ,T)
S1
For any (Zn, TN)
S21
S2
R = R \ (Zn, TN)
S3
Is (Zn,Tn) associated to any source ?
No
Yes
S4
Dissociate (Zn,Tn) from Vn
Retrieve the posterior of the related source
S5
Gibbs sampling
Vn
S6
Is Vn new ?
No
Yes
S7
Create a new source
S8
Associate (Zn,Tn) to source Vn
Update the posterior of source Vn
S9
Is R empty ?
No
S11
Another (Zn,Tn)
Yes
S10
No
Converge ?
Yes
Source position

COMPUTER IMPLEMENTED METHOD FOR ESTIMATING INTERFERERS OF RADIOFREQUENCY SYSTEM, COMPUTER PROGRAM, AND DEVICE

TECHNICAL FIELD

The invention is related to interference classification in a radiofrequency system.

BACKGROUND ART

In an application, the radiofrequency system is involved in an environment of mobility (for example around a high speed train) where geolocation can be exploited so as to determine a trajectory of mobility.

More particularly, the radiofrequency system can be a CBTC radio system ("Communication-Based Train Control") such as the one disclosed for example in document EP3522404. It is wished furthermore that this type of system, embarked in a train, characterizes the environment by spatially identifying the interference sources. More particularly, it is sought to identify the position of the interferers, without adding any complication to the CBTC radio hardware by only using power measurement of a CBTC radio module. Since the interference strength depends on the train-interferer distance, and the moving train allows geometrically sampling signal strength of interferences in different locations, estimating the position of interferers should be possible hence.

The interference geolocation problem exists not only in CBTC systems, but also in any communication-based transport system (car, boat, etc.) and the following can be applied for any system with the capability of moving and sampling the interference strength. However, in any case, the condition on known trajectory must be fulfilled (such as for the case of a railway train typically) so as to make the problem feasible to be solved.

Hereafter, the case of the train environment is presented as an example. The system can be described as follows:

- The train is travelling with the speed: v (m/s),
- The train's radio can measure at the rate: R (times/s)
- The train's position is known for every measurement
- K interferers are in different and respective fix locations, randomly interfering the train's radio. Considering that, from one measurement to another, the interferers are randomly activated or not.
- The path loss in dB can be given as: a+b. log d, where d is the Tx–Rx distance, a and b denote path loss coefficients.
- Shadowing between two different positions correlates with a coefficient as:

$$\rho_0 e^{-\frac{|\Delta x|}{d_c}},$$

where $\Delta x$ is the train position difference, $\rho_0$ and $d_c$ being coefficients of a shadowing model.
- For example a CSMA protocol ("Carrier Sense Multiple Access"—CA or CD) is performed among interferers close to each other, and therefore a non-contention condition can be satisfied.

In other words, the measurement belongs to only one source at one moment. However, the interferers randomly switch one to another which makes the observation a mixed signal. In addition, the interference appearance is also random due to the data traffic model.

The problem then can be divided as two main sub-questions:

- Source separation: Since an observation can randomly belong to one of K sources, one needs to identify which source.
- Position estimation: Once the observations are classified, the sources' positions can be estimated.

These two questions are jointly dependent, the solution of one affects the other.

The present invention aims to improve the situation.

SUMMARY OF INVENTION

It proposes a computer implemented method for estimating interferers of a radiofrequency system embarked in a moving vehicle having a known trajectory at each time n, with a non overlapping condition between the interferers considered as K independent active sources of interference having respective positions $\theta=[\theta_1, \ldots, \theta_k, \ldots, \theta_K]$, the method comprising:

- Obtaining observations $Z_n$ corresponding to measurement of interference from time instant 1 to N, and building an observation vector $Z=[Z_1, \ldots, Z_n, \ldots, Z_N]$,
- Defining a latent variable $V_n$ indicating which source is activated at moment n, to build a vector of latent variables $V=[V_1, \ldots, V_n, \ldots, V_N]$, and
- Implementing a Dirichlet process involving a Gibbs sampling with a Markov chain defined by vector $V=[V_1, \ldots, V_n, \ldots, V_N]$, the sampling as follows, being repeated until convergence:
  - For n=1, . . . , N,
    - If the observation $Z_n$ is already associated to a source, remove observation $Z_n$ from its current associated source corresponding to latent variable $V_n$, and retrieve a position posterior of this source as the observation $Z_n$ is no longer belonging to this source,
    - Draw a new value of latent variable $V_n$, based on a conditional probability $P(V_n=k|V_{-n}, Z_{-n}, Z_n)$ depending on whether a source k pre-existed or not,
    - Associate the observation $Z_n$ to the source corresponding to latent variable $V_n$, and update the posterior distribution of the position for the source corresponding to latent variable $V_n$,
- and, upon convergence of the algorithm, operating thereby:
- a separation of the interfering sources into K independent measurement sets related respectively to the K interfering sources, and
- an estimation of each source position with the sources thus separated.

The aforesaid "moving vehicle" having a known trajectory can be for example a railway train (having a fixed and predefined trajectory), or alternatively any other vehicle equipped with a GPS estimating in real time its successive locations.

The aforesaid "non overlapping condition" implies that no collision can occur between interferers such that, at one time moment, only one interference source emits a signal (like in a multiple access protocol e.g. CSMA/CA protocol or CSMA/CD).

The aforesaid measurements of interference can be in the form of radiofrequency power or energy or amplitude level.

The invention proposes the use of a latent variable $V_n$ for providing a prior knowledge whenever it is tried to seek which observation belongs to which source. While doing the source separation, taking any decision is replaced by drawing a sample based on the calculated probability. The process is iterated repeatedly until the estimation converges, based on a Monte Carlo mechanism.

Therefore, in an embodiment, a probability can be evaluated to identify which source an observation $Z_n$ belongs to, said probability being given by:

$$P(V_n \mid V_{-n}, Z_{-n}, Z_n) \propto P(Z_n \mid V_{-n}, Z_{-n}, V_n)P(V_n \mid V_{-n}) = P(V_n \mid V_{-n})\int p\left(Z_n^{(V_n)} \mid Z_{-n}^{(V_n)}, \theta_{V_n}\right) \cdot p\left(\theta_{V_n} \mid Z_{-n}^{(V_n)}\right)d\theta_{V_n}$$

where $(\,)_{-n}$ refers to an index other than n, the probability $$p\left(Z_n^{(V_n)} \mid Z_{-n}^{(V_n)}, \theta_{V_n}\right)$$

being a conditional probability of an observation $Z_n$ to be associated to the source corresponding to latent variable $V_n$, given other measurement $Z_{-n}$ already associated to this source.

Moreover, the posterior distribution of the position of a source of interference can be updated progressively to estimate the source's position by implementing:

$$P\left(\theta_{V_n} | Z_{-n}^{(V_n)}, Z_n^{(V_n)}\right) = \frac{P\left(Z_n^{(V_n)} | Z_{-n}^{(V_n)}, \theta_{V_n}\right) P\left(\theta_k | Z_{-n}^{(V_n)}\right)}{P\left(Z_n^{(V_n)} | Z_{-n}^{(V_n)}\right)}$$

where $(\,)_{-n}$ refers to an index other than n.

The distribution can be a gaussian distribution and the probability $$p\left(Z_n^{(V_n)} \mid Z_{-n}^{(V_n)}, \theta_{V_n}\right)$$

can be thus expressed as:

$$p\left(Z_n^{(V_n)} | Z_{-n}^{(V_n)}, \theta_{V_n}\right) = \frac{1}{\sqrt{2\pi\sigma_{n|-n}^{(V_n)^2}}} e^{-\frac{\left(Z_n - \mu_{n|-n}^{(V_n)}\right)^2}{2\sigma_{n|-n}^{(V_n)^2}}}$$

In this expression, the terms $$\mu_{n|-n}^{(V_n)}$$

and $$\sigma_{n|-n}^{(V_n)}$$

can be calculated as follows:

$$\begin{cases} \mu_{n|-n}^{(V_n)} = \mu_n^{(V_n)} + \sum_{n|-n}^{(V_n)} \sum_{-n}^{(V_n)^{-1}} \left(Z_{-n}^{(V_n)} - \mu_{-n}^{(V_n)}\right) \\ \sigma_{n|-n}^{(V_n)^2} = \sigma^2 - \sum_{n|-n}^{(V_n)} \sum_{-n}^{(V_n)^{-1}} \sum_{-n|n}^{(V_n)} \end{cases},$$

where:

$$-\mu_n^{(V_n)}$$

denotes a mean in a gaussian distribution for the observation $Z_n$, and expressed as $$\mu_n^{(V_n)} = a + b \log\left\|T_n - \theta_{V_n}\right\|$$

$$-\sum_{n|-n}^{(V_n)}$$

denotes a correlation matrix between observation n and the other observation than n of source $V_n$, $$-\sum_{-n}^{(V_n)}$$

denotes an auto-correlation matrix of observations other than n of source $V_n$, $$-\mu_{-n}^{(V_n)}$$

denotes the mean at observations other than n of source $V_n$, $$-\sum_{-n|n}^{(V_n)}$$

denotes the correlation matrix between observations other than n and observation n of source $V_n$.

The correlation between two observations $n_1$, $n_2$ can be expressed as $$\rho = \rho_0 e - \frac{\left\|T_{n_1} - T_{n_2}\right\|}{d_c},$$

where $\rho_0$ and $d_c$ are two parameters of a shadowing model typically.

The conditional probability $p(V_n = k | V_{-n})$ can be given by:

$$p\left(V_n = k | V_{-n}\right) = \frac{N_k + \alpha/K}{N - 1 + \alpha}$$

where $N_k$ is a number of observations associated to a source corresponding to $V_n$, N is the total number of observations, $\alpha$ being a concentration parameter.

When the number of possible interferers K is unknown (leading thus to consider K=∞):

the conditional probability for an observation to belong to a pre-existing source k can therefore be given by:

$$p(V_n = k|V_{-n}) = \frac{N_k}{N-1+\alpha}$$

and the conditional probability for an observation to belong to a new source k' is given by:

$$p(V_n = k'|V_{-n}) = \frac{\alpha}{N-1+\alpha}$$

The aforesaid conditional probability $P(V_n=k|V_{-n}, Z_{-n}, Z_n)$ depending on whether a source k pre-existed or not can be given in an embodiment by:

$$b\frac{N_k}{N-1+\alpha}\int p\left(Z_n^{(k)}\middle|Z_{-n}^{(k)}, \theta_k\right)\cdot p\left(\theta_k\middle|Z_{-n}^{(k)}\right)d\theta_k,$$

for an existing source k, or to $$b\frac{\alpha}{N-1+\alpha}\int p(Z_n|\theta)\cdot G_0(\theta)\,d\theta,$$

for a new source, where b is an appropriate normalizing constant making the above given probabilities sum to one.

In an embodiment, the Dirichlet process involves a Dirichlet mixture model defined as:

$$\begin{cases} Z_n|V_n, \theta \sim \mathcal{N}\left(\mu_n^{(V_n)}, \sigma_n^{2(V_n)}\right) \\ V_n \sim \text{Discrete}(p_1, \ldots, p_K) \\ p \sim \text{Dirichlet}(\alpha/K) \\ \theta_k \sim G_0 \end{cases}$$

where $G_0$ is a base distribution of position of a source.

In an embodiment, the method comprises further an estimation of a likelihood $$p\left(Z_n^{(V_n)} \,\middle|\, Z_{-n}^{(V_n)}, \theta_{V_n}\right),$$

as a function of the mobile vehicle position $T_n$, given by:

$$p\left(Z_n^{(V_n)}\middle|Z_{-n}^{(V_n)}, \theta_{V_n}\right) = A\cdot\exp\left(-B\left(\sum_n c_n\log(\theta - T_n) - h'\right)^2\right).$$

In a first embodiment, position θ can be discretized into discrete values in a discrete space $\Omega_\theta$, each value of position θ in said discrete space being associated with a probability.

In a second alternative embodiment, a continuous position determination can be performed by partitioning a space around the mobile vehicle position into sub-partitions s=1, . . . , S, each sub-partition being represented by a center $C_S$, the vehicle position $T_n$ being in sub-partition s, and the likelihood being given by:

$$p\left(Z_n^{(V_n)}\middle|Z_{-n}^{(V_n)}, \theta_{V_n}\right) = A\exp\left(-B\left(\sum_n c_n\log(\theta - T_n) - h'\right)^2\right) \approx A\exp\left(-B\left(\sum_s w_s\log(\theta - C_s^n) - h'\right)^2\right)$$

Where $$C_s^i$$

is determined by $$C_s^n = \underset{C_s}{\operatorname{argmin}}\,|T_n - C_s|,$$

the base distribution $G_0$ being given by $$G_0(\theta) = A_0\exp\left(-B_0\left(\sum_s w_s^0\log(\theta - C_s) - h_0'\right)^2\right).$$

The present invention aims also at a computer program comprising instructions for performing the method presented above, when such instructions are executed by a processing circuit of a device (such as the one presented in FIG. 10). The invention aims also at a non transitory computer readable medium (such as the memory MEM presented in FIG. 10) storing such instructions.

The present invention aims also at a device comprising a processing circuit configured to implement the method presented above (and described below with reference to FIG. 10).

More details and advantages of the invention will be understood when reading the following description of embodiments given below as examples, and will appear from the related drawings.

BRIEF DESCRIPTION OF DRAWINGS

FIG. 8 shows an algorithm having steps of the method presented above, according to a possible embodiment.

DESCRIPTION OF EMBODIMENTS

Figure 1:
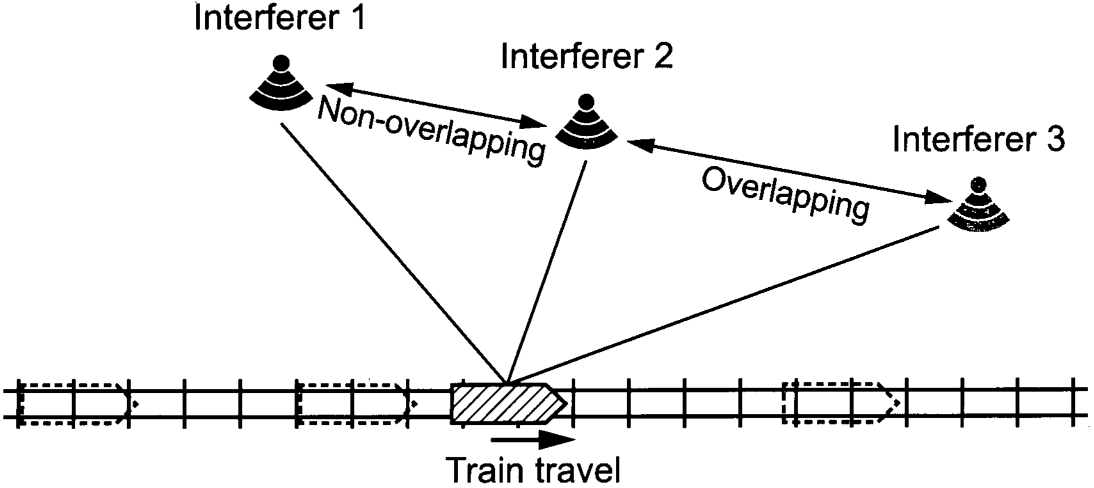
FIG. 1 shows a CBTC radiofrequency system measuring the interference at each position on its trajectory.

Reference is made now to FIG. 1 to present the main concept of geolocation of several waysides interferers from measurements made in a train. The several positions enable for having different geometrical views of the problem and thus for estimating the position of one interferer. When several interferers are present in the system, source separation is to be performed in order to associate each observation with each interferer and then use the previously mentioned geolocation technique from observation at several positions. However, the number of interferers is usually unknown.

It is proposed here to solve the two aforementioned questions of source separation and source geolocation, by using a machine learning approach relying on Dirichlet processes and Gibbs sampling. In particular, the geo-location problem cannot be expressed in a form which can allow a conventional Gibbs sampling. Thus, it is proposed two approaches to cope with this issue:

- A grid of interferers positions, in which it is addressed in particular the mechanism of updating and retrieving the probability when adding and removing (respectively) an observation. These features (adding and removing an observation) enables the Gibbs sampling.
- The approximation of geo-location problem, in which the exact problem is approximated by a closed-form, which allows the update and retrieve in a more simple way by adjusting several parameters of this closed-form.

Figure 2:
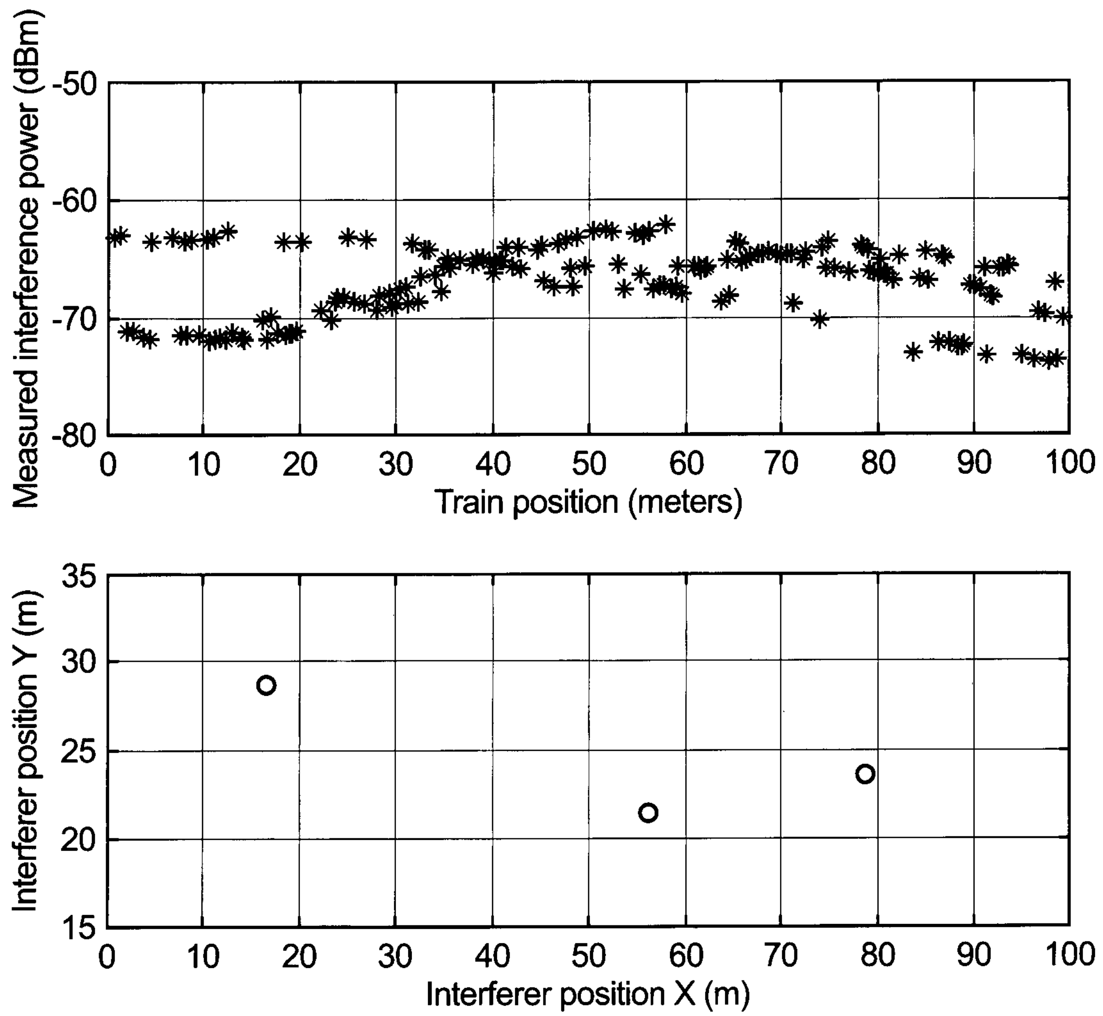
FIG. 2 shows measured power of interference and the true position of interferers.

Taking an example where power measurements of interference on the train are obtained as $Z=(Z_1, \ldots, Z_n, \ldots, Z_N)$ according to train's position as $T=(T_1, \ldots, T_n) \ldots, T_N)$, a plot (T, Z) is given in the upper sub-figure of FIG. 2. The objective is to find the true position of interferers plotted in the lower sub-figure of FIG. 2.

Knowing the measurements are mixed between sources, therefore to efficiently geolocate the sources, firstly it is needed to separate them into independent ones, and it is introduced here a latent variable that indicates which source is activated at moment n:

$$V=[V_1, \ldots, V_n, \ldots, V_N].$$

Furthermore, in the following, $\theta=(\theta_1, \theta_2, \ldots, \theta_K)$ denotes the vector of position of K interferers. The Dirichlet mixture model can be stated, according to the problem to solve, as follows:

$$\begin{cases} Z_n \middle| V_n, \theta \sim \mathcal{N}\left(\mu_n^{(V_n)}, \sigma_n^{2(V_n)}\right) \\ V_n \sim \text{Discrete}(p_1, \ldots, p_K) \\ p \sim \text{Dirichlet}(\alpha/K) \\ \theta_k \sim G_0 \end{cases}$$

where $$\mathcal{N}\left(\mu_n^{(V_n)}, \sigma_n^{2(V_n)}\right)$$

denotes the normal distribution, $\alpha$ being the concentration parameter, K is the number of sources, and $G_0$ is the base distribution of position of a source ($\theta_k$ denoting a source position parameter). The number of sources is supposed to be unknown, then $K=\infty$.

The algorithm can mainly be structured as follows:

For very first observation $Z_1$, create a very first source and associate $Z_1$ to this source ($V_1=1$), then update the posterior distribution of its position by Bayes rule as follows $$p(\theta_1 \mid Z_1, V_1=1) \propto p\left(Z_1^{(1)} \middle| \theta_1\right) \cdot G_0$$

From the second observation, for any n:

Draw a sample for new value of $V_n$, based on the conditional probability as follows (Gibbs sampling):

For an existing source k:

$$b\frac{N_k}{N-1+\alpha}\int p\left(Z_n^{(k)} \middle| Z_{-n}^{(k)}, \theta_k\right) \cdot p\left(\theta_{V_n} \middle| Z_{-n}^{(k)}\right) d\theta_k$$

For a new source:

$$b\frac{\alpha}{N-1+\alpha}\int p(Z_n|\theta) \cdot G_0(\theta)$$

Here, b is the appropriate normalizing constant that makes the above probabilities sum to one, $N_k$ is the number of observations in the source k.

Associate $Z_n$ to the source $V_n$, and update the posterior distribution of its position by Bayes rule.

Figure 3:
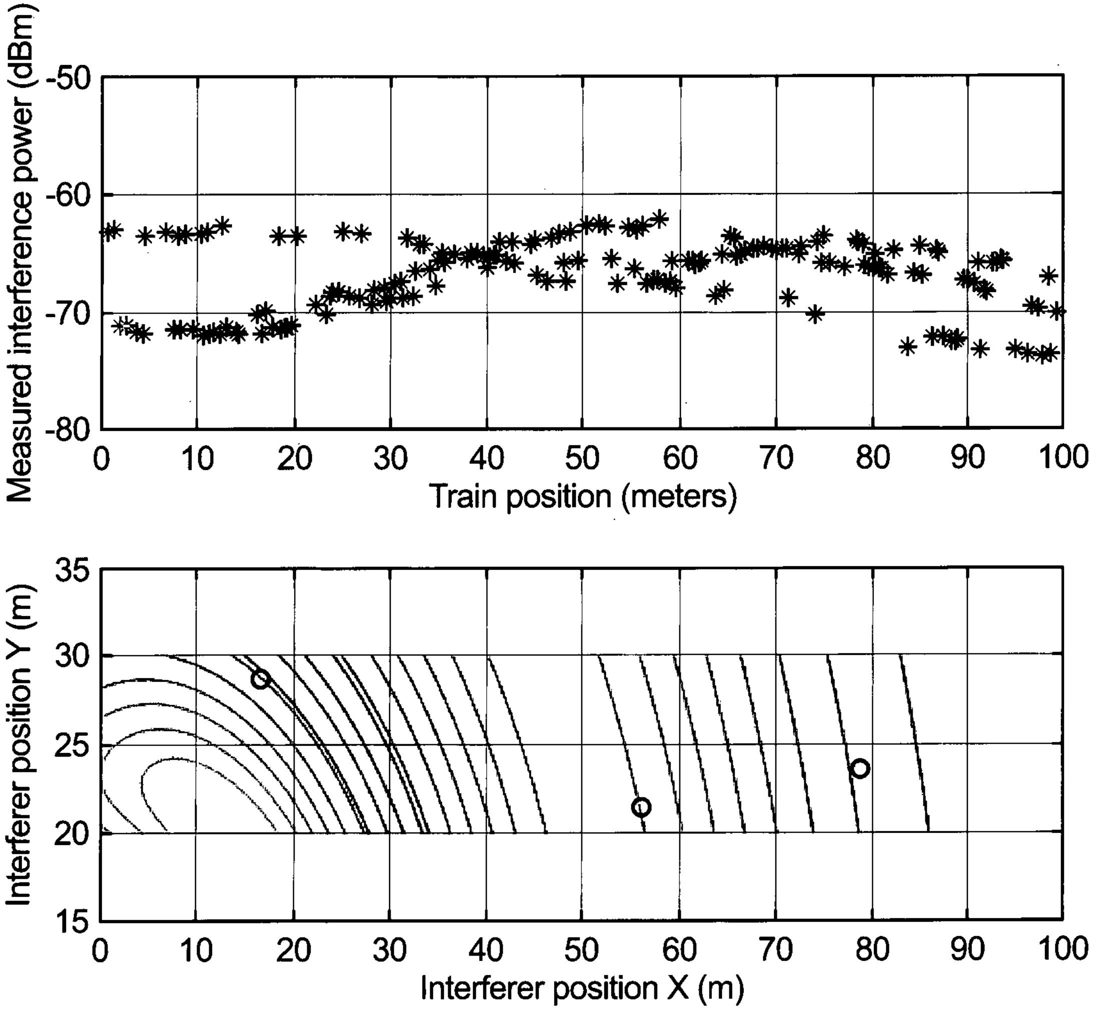
FIG. 3 shows two first interferers being detected.

In this example, a plot of the result after three first observations is given in FIG. 3. As it can be seen, two first observations are associated to the first source and the third is associated to the second source. The posterior distribution of position of these sources are plotted as contours in the lower sub-figure. Since, the first source has two observations, the distribution of its position is denser compared the second one which has only one observation associated.

Figure 4:
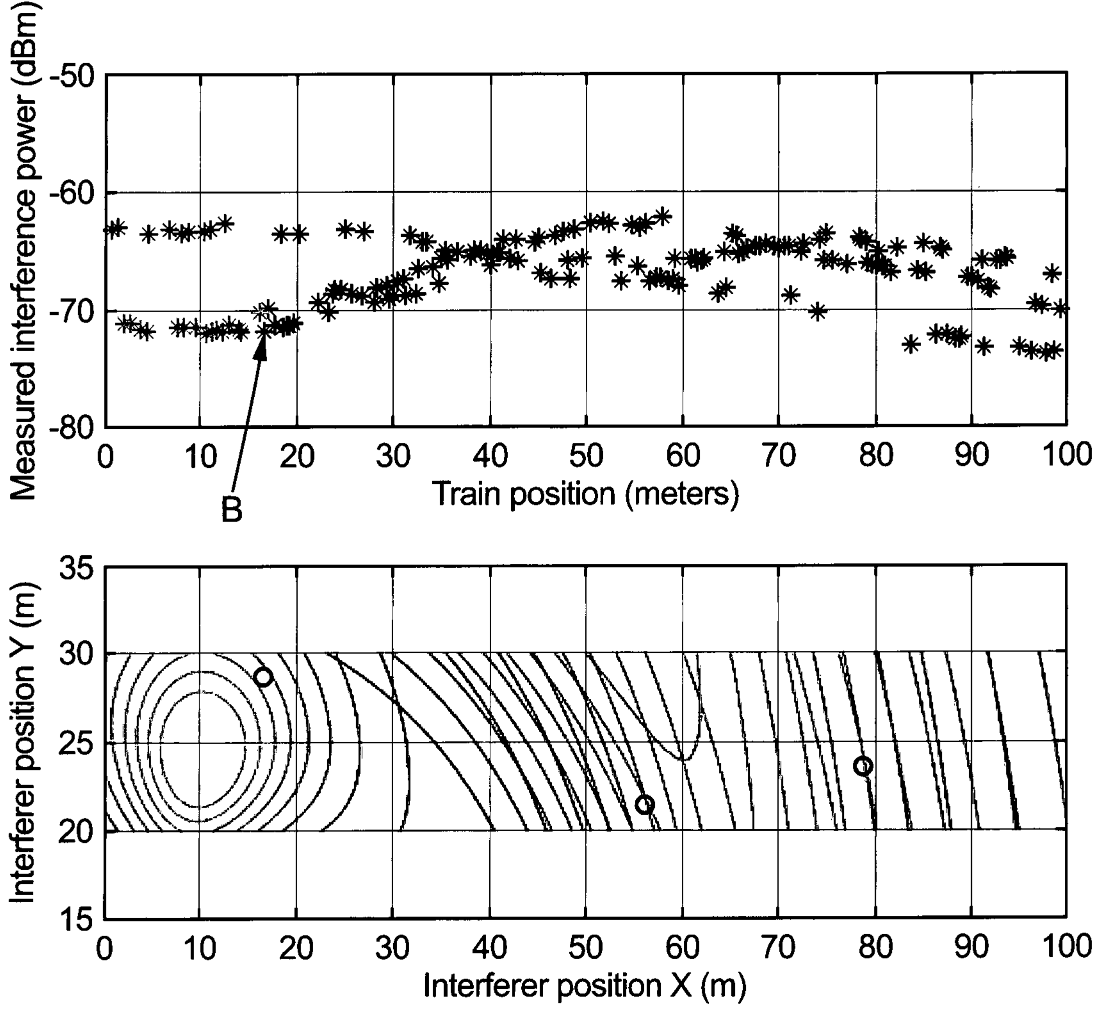
FIG. 4 shows the appearance of a third source of interference.

FIG. 4 shows the appearance of the third source, plotted B in the upper sub-figure.

Figure 5:
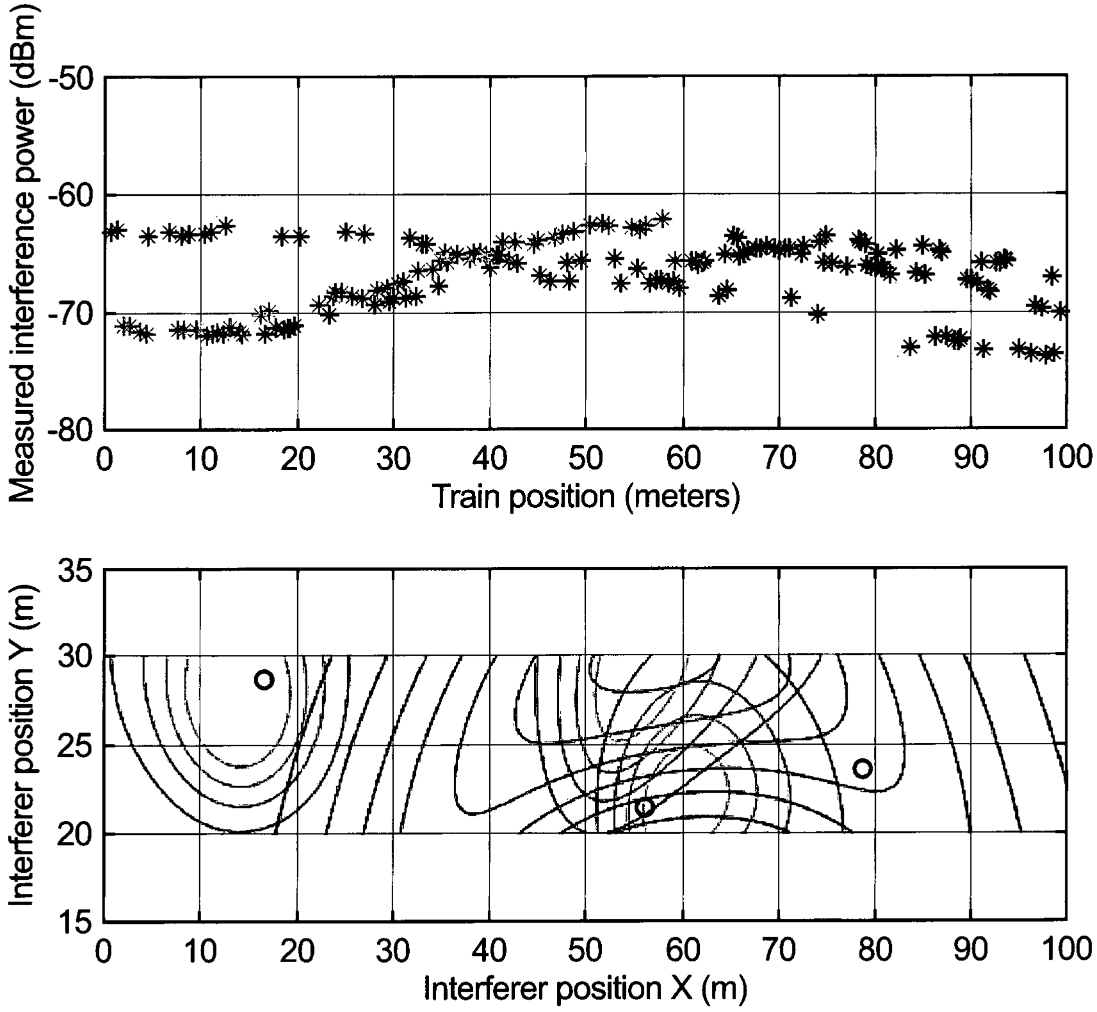
FIG. 5 shows the appearance of a fourth source of interference.

An algorithm which is presented in details below with reference to FIG. 8 continues the estimation and decides itself whether there is another source or not until the end of observation. The estimate is plotted in FIG. 5. Bearing in mind that there are only three sources here, this estimate is still not accurate.

Figure 6:
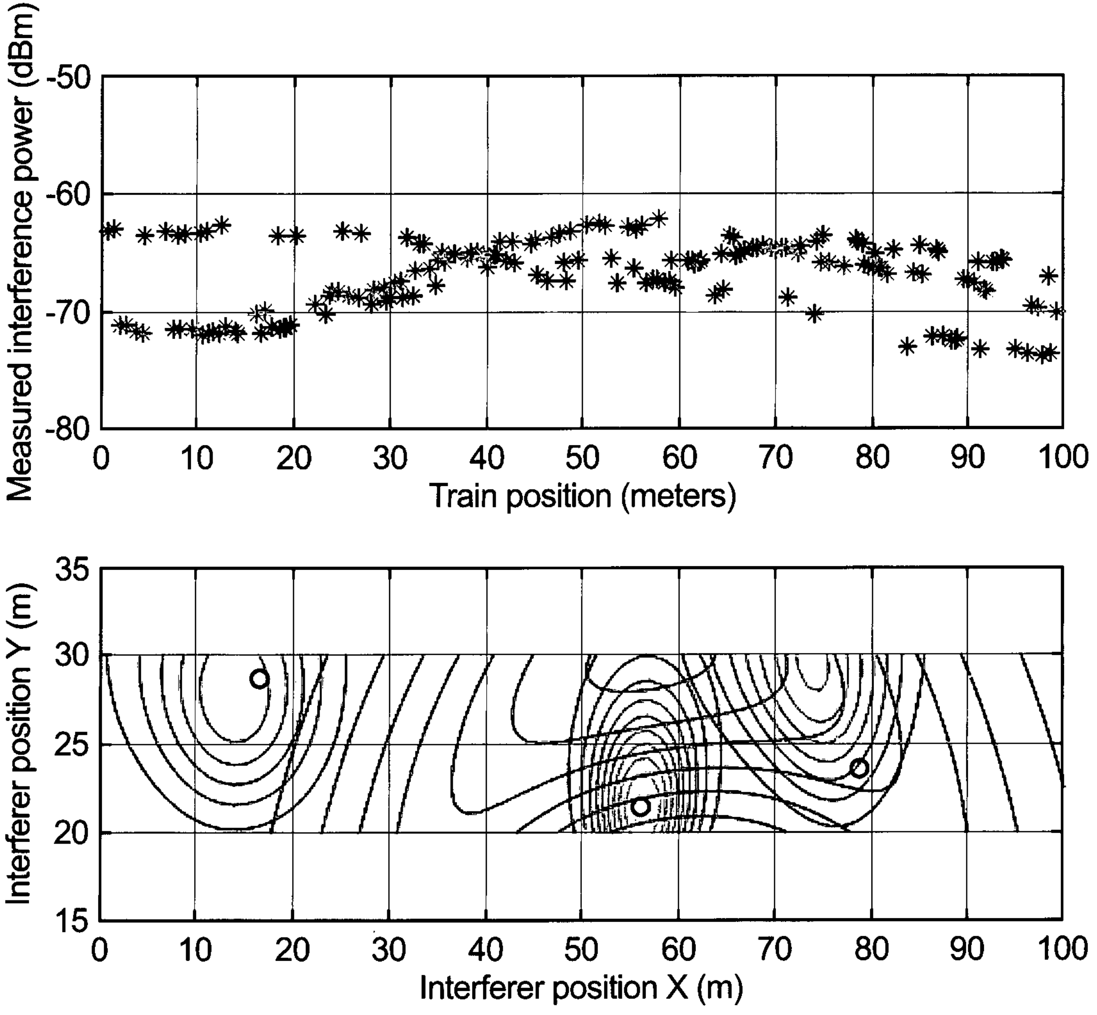
FIG. 6 shows the estimate in the end of a first iteration.

The estimation can be continued until the end of observation, meaning n=N. The estimate at this moment is shown in FIG. 6. The algorithm estimates there are at least four sources and the probability for their position is as in the lower sub-figure of FIG. 6.

The algorithm is not stopping here, and comes back to the first observation and:

Dissociate the observation from current associated source

Retrieve the posterior distribution of the related source as the observation is no longer in this source Draw a sample for new value of $V_n$, based on the conditional probability as follows (Gibbs sampling):

For an existing source k:

$$b\frac{N_k}{N-1+\alpha}\int p\left(Z_n^{(k)} \middle| Z_{-n}^{(k)}, \theta_k\right) \cdot p\left(\theta_{V_n} \middle| Z_{-n}^{(k)}\right) d\theta_k$$

For a new source:

$$b\frac{\alpha}{N-1+\alpha}\int p(Z_n \mid \theta) \cdot G_O(\theta)$$

Figure 7:
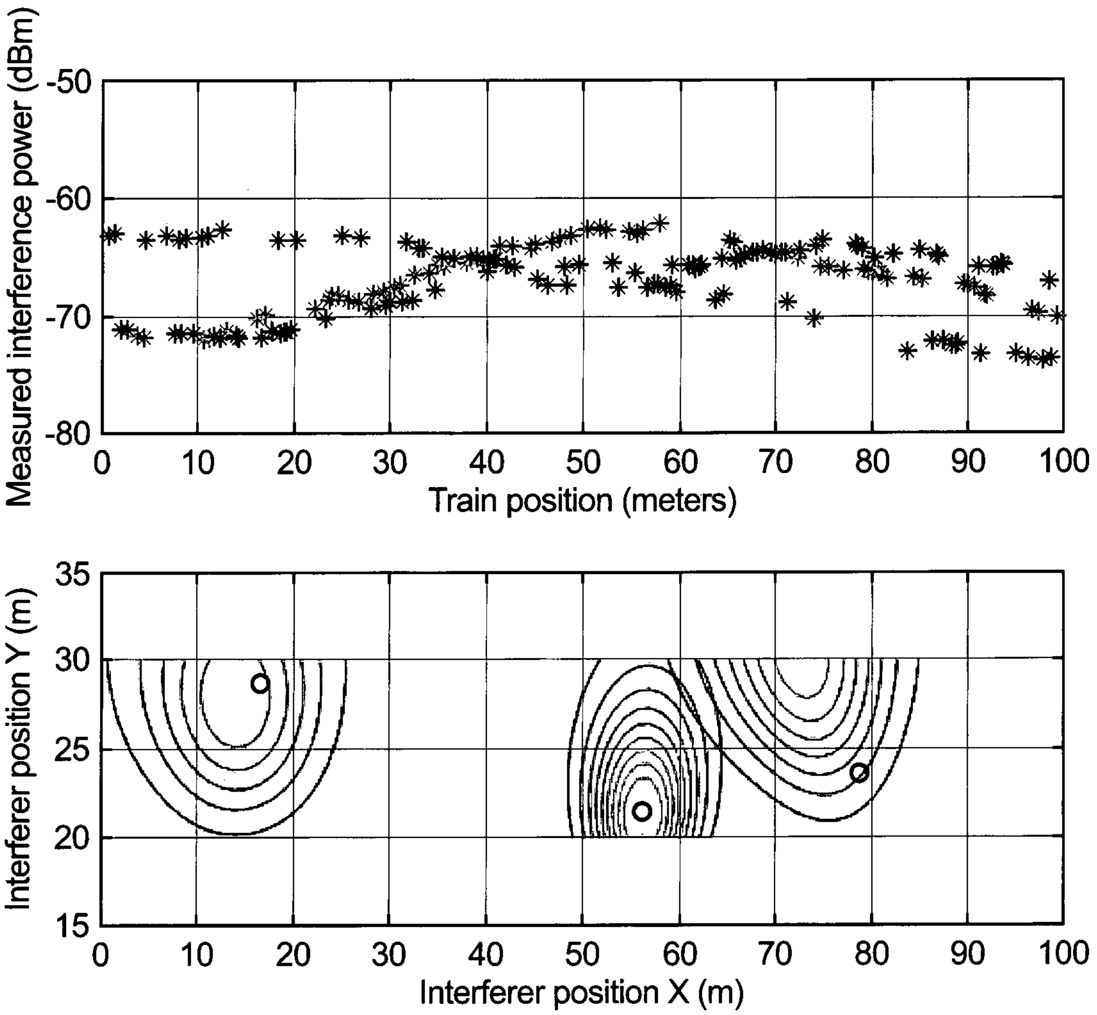
FIG. 7 shows the converged estimate.

The process is repeated iteratively until the estimate converge as the result shown in FIG. 7 showing finally only three sources which are well defined spatially.

To make Gibbs sampling feasible, it should be possible to update or retrieve the posterior distribution whenever an observation is deemed to be associated to or dissociated from a source. Regarding the specific problem, there does not exist a closed form for the distribution to be updated or retrieved and to cope with this issue. Hence, two approaches are proposed here:

Discretization: To simplify the problem, the parameter position $\theta$ is discretized into discrete values defining thus a discrete space $\Omega_\theta$. For example, considering a 2D space of interferer's position, $\theta$ is discretized uniformly in both X and Y axis. Each value of $\theta$ in this grid is associated with a probability. The update or retrieve for each source is done by adjusting the probability for every value of $\theta$ in $\Omega_\theta$, Approximation: the exact problem is approximated by partitioning into several forms, which allows the update and retrieve in a more simple way by adjusting several parameters of the sub-form.

A corresponding flowchart reflecting the algorithm is presented in FIG. 8. The algorithm is presented below with definitions and conditions given hereafter:

Non-overlapping condition: it is supposed that there is no collision between interferers such that, at a time moment, only one interference source emits signal. This condition can be satisfied by using CSMA/CA protocol or CSMA/CD for example.

Known train trajectory (in step S1): data of the train positions $T_1, T_2, \ldots, T_n, \ldots, T_N$ are received successively and the algorithm can know its position as well as its velocity and direction at any moment.

Figure 9:
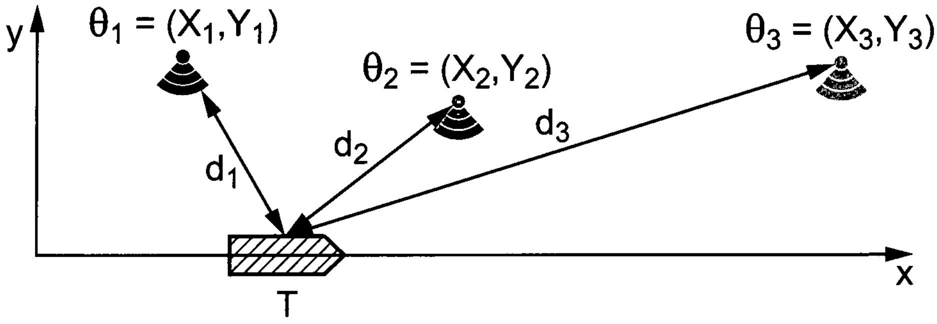
FIG. 9 shows a local coordinate system.

The notations of the local coordinate systems are given as shown in FIG. 9.

Distance between train and interferer k, at time n, is given by:

$$d_n^{(k)} = \|T_n - \theta_k\| \tag{1}$$

Interference received power $Z_n$ on the train, if the interferer k is active, is measured in step S1 at time n (the path loss model being considered as known)

$$Z_n = a + b\log d_n^{(k)} + w_n^{(k)}, \tag{2}$$

where a and b are two coefficients of path-loss model and $$w_n^{(k)}$$

denotes the shadow fading on the train with respect to interferer k, at time n.

The shadow fading follows the multivariate Gaussian distribution with the correlation between two train positions $T_n$ and $T_m$ expressed as $$\rho = \rho_0 e^{-\frac{\|T_n - T_m\|}{d_c}}, \tag{3}$$

where $\rho_0$, $d_c$ are coefficients of shadowing model (also known).

The path-loss and shadowing model are known.

Assuming that there are K sources of interference, therefore the parameters to be estimated are their positions:

$$\theta = [\theta_1, \ldots, \theta_k, \ldots, \theta_K]. \tag{4}$$

On the train, the radio module measures the power level of interference from time instant 1 to N, the observation vector can be written as stated in step S1 of FIG. 8:

$$Z = [Z_1, \ldots, Z_n, \ldots, Z_N]. \tag{5}$$

However, the information of which one among K interferers is active at any time instant, is unknown. In this sense, the observation is mixed among sources. Combining with non-overlapping condition, at a time instant there is only one emitting source.

Moreover, a latent variable that indicates which source is activated at moment n, is introduced:

$$V = [V_1, \ldots, V_n, \ldots, V_N], \tag{6}$$

In order to geolocate the interferers, two problem need to be solved:

Source separation: the power measurement on the train is a mixed signal, needing to separate them into K independent sets which are related to K interferers.

Source geolocation: once the sources are separated, their positions can be estimated.

The two above-mentioned sub-problems are correlated: the performance of one affects the other. The Dirichlet mixture model (described for example in reference [1], the details of which are given at the end of the description, below) can be stated, according to the main problem to solve, as follows:

$$\begin{cases} Z_n \mid V_n, \theta \sim \mathcal{N}\left(\mu_n^{(V_n)}, \sigma_n^{2(V_n)}\right) \\ V_n \sim \text{Discrete}(p_1, \ldots, p_K) \\ p \sim \text{Dirichlet}(\alpha/K) \\ \theta_k \sim G_0(\theta_k) \end{cases}$$

Based on this model, a Markov Chain Monte Carlo algorithm is implemented, involving a Gibbs sampling. The principle is to separate the measurements into independent sources and then update the distribution of sources' position in order to be able to geolocate the sources.

A Markov Chain Monte Carlo simulation is performed by repeating the following operations until convergence:

After building in step S1 a global set $\mathcal{R}$ of observations given by couples $(Z_n, T_n)$ of radiofrequency power measurements $Z_n$ and train positions $T_n$, for n=1, . . . , N (and then for an observation at time n given by a couple $(Z_n, T_n)$ as stated in step S21 of FIG. 8):

in step S2, the observation $(Z_n, T_n)$ is removed from the global set $\mathcal{R}$ of observations;

If the observation $(Z_n, T_n)$ is already associated to a source $V_n$ (test S3: Yes), dissociate observation $(Z_n, T_n)$ from its current associated source $V_n$ (in step S4), and retrieve the position posterior of this source as the observation at time n is no longer belonging to this source;

In step S5, for the Gibbs sampling implementation, draw a sample for a new value of $V_n$ given with probabilities as follows:

$$b\frac{N_k}{N-1+\alpha}\int p\left(Z_n^{(k)} \mid Z_{-n}^{(k)}, \theta_k\right)\cdot p\left(\theta_k \mid Z_{-n}^{(k)}\right)d\theta_k,$$

for an existing source k already detected, $$b\frac{\alpha}{N-1+\alpha}\int p(Z_n \mid \theta)\cdot G_0(\theta)d\theta,$$

for a new source, where b is an appropriate normalizing constant making the above given probabilities sum to one;

If $V_n$ is new (test S6), create a new source (S7);

Associate the observation $(Z_n, T_n)$ to the source $V_n$, and update its posterior (S8).

For each iteration, after all measurements are considered (test S9 and loop on S11), a condition (test S10) is added to check whether the convergence is met or not. The convergence condition can be diverse: the convergence of source position, or the convergence on the repartition of measurements, or the maximum number of iterations, etc.

In step S5 of FIG. 8, the Gibbs sampling is more particularly performed by evaluating the following probability so as to identify which source the observation n belongs to:

$$P(V_n \mid V_{-n}, Z_{-n}, Z_n) \propto P(Z_n \mid V_{-n}, Z_{-n}, V_n)P(V_n \mid V_{-n}) = P(V_n \mid V_{-n})\int p\left(Z_n^{(V_n)} \mid Z_{-n}^{(V_n)}, \theta_{V_n}\right)\cdot p\left(\theta_{V_n} \mid Z_{-n}^{(V_n)}\right)d\theta_{V_n}$$

where $(\ )_{-n}$ denotes the "other than n". The probability $$p\left(Z_n^{(V_n)} \mid Z_{-n}^{(V_n)}, \theta_{V_n}\right)$$

is the conditional probability of observation n in the source $(V_n)$, given the other observations already associated to this source. This conditional probability is Gaussian with following mean and variance:

$$\begin{cases} \mu_{n|-n}^{(V_n)} = \mu_n^{(V_n)} + \sum_{n|-n}^{(V_n)}\sum_{-n}^{(V_n)^{-1}}\left(Z_{-n}^{(V_n)} - \mu_{-n}^{(V_n)}\right) \\ \sigma_{n|-n}^{(V_n)^2} = \sigma^2 - \sum_{n|-n}^{(V_n)}\sum_{-n}^{(V_n)^{-1}}\sum_{-n|n}^{(V_n)} \end{cases},$$

where $$\mu_n^{(V_n)}$$

denotes the mean at time n of source $V_n$, $$\sum_{n|-n}^{(V_n)}$$

denotes the correlation matrix between observation n and the other observation than n of source $V_n$, $$\sum_{-n}^{(V_n)}$$

denotes the auto-correlation matrix of observations other than n of source $V_n$, $$\mu_{-n}^{(V_n)}$$

denotes the mean at observations other than n of source $V_n$, $$\sum_{-n|n}^{(V_n)}$$

denotes the correlation matrix between observations other than n and observation n of source $V_n$.

Hence, the probability $$p\left(Z_n^{(V_n)} \mid Z_{-n}^{(V_n)}, \theta_{V_n}\right)$$

is expressed as:

$$p\left(Z_n^{(V_n)} \mid Z_{-n}^{(V_n)}, \theta_{V_n}\right) = \frac{1}{\sqrt{2\pi\sigma_{n|-n}^{(V_n)^2}}}e^{-\frac{\left(Z_n - \mu_{n|-n}^{(V_n)}\right)^2}{2\sigma_{n|-n}^{(V_n)^2}}}$$

$$\text{Since } \mu_n^{(V_n)} = a + b\log\left\|T_n - \theta_{V_n}\right\|, \text{ then } \sum_{n|-n}^{(V_n)}\sum_{-n}^{(V_n)^{-1}}\mu_{n|-n}^{(V_n)}$$

can be rewritten as $\Sigma_{l \neq n} c_l \log(\theta_{V_l} - T_l) + h$.

The conditional probability $p(V_n = k \mid V_{-n})$ can be expressed as $$p(V_n = k \mid V_{-n}) = \frac{N_k + \alpha/K}{N-1+\alpha}$$

where $N_k$ is the number of observations associated to source $V_n$, and N is the total number of observations.

The number K can be such that $K=\infty$ to define a non-parametric model, and then:

The conditional probability for an observation to belong to an existing source k is $$p(V_n = k \mid V_{-n}) = \frac{N_k}{N-1+\alpha}$$

The conditional probability for an observation to belong to a new source k' is $$p(V_n = k' \mid V_{-n}) = \frac{\alpha}{N-1+\alpha}$$

and the posterior is updated progressively to estimate the source's position:

$$P\left(\theta_{V_n} \mid Z_{-n}^{(V_n)}, Z_n^{(V_n)}\right) = \frac{P\left(Z_n^{(V_n)} \mid Z_{-n}^{(V_n)}, \theta_{V_n}\right)P\left(\theta_k \mid Z_{-n}^{(V_n)}\right)}{P\left(Z_n^{(V_n)} \mid Z_{-n}^{(V_n)}\right)}.$$

To implement the above-mentioned algorithm, an appropriate base distribution $G_0$ should be able to update and retrieve the posterior in each step of Gibbs sampling. Regarding the likelihood $$p\left(Z_n^{(V_n)} \mid Z_{-n}^{(V_n)}, \theta_{V_n}\right),$$

this is a function of the train position $T_n$. The likelihood exists in this form $$p\left(Z_n^{(V_n)} \mid Z_{-n}^{(V_n)}, \theta_{V_n}\right) = A \cdot \exp\left(-B\left(\sum_n c_n \log(\theta - T_n) - h'\right)^2\right).$$

In order to theoretically update or retrieve the posterior with the above likelihood, proposing a $G_0$ to be conjugate with the above likelihood is not simple.

To simplify the problem, a first embodiment can propose to discretize the position θ into discrete values and call this discrete space as $\Omega_\theta$. For example, considering a 2D space of interferer's position, θ is discretized uniformly in both X and Y axis. Each value of θ in this grid is associated with a probability.

The update or retrieve for each source is done by adjusting the probability for every value of θ in $\Omega_\theta$ as follows:

Update the posterior if adding an observation $$P\left(\theta_{V_n} \mid Z_{-n}^{(V_n)}, Z_n^{(V_n)}\right) = \frac{P\left(Z_n^{(V_n)} \mid Z_{-n}^{(V_n)}, \theta_{V_n}\right)P\left(\theta_k \mid Z_{-n}^{(V_n)}\right)}{P\left(Z_n^{(V_n)} \mid Z_{-n}^{(V_n)}\right)}$$

Retrieve the posterior if removing an observation $$P\left(\theta_k \mid Z_{-n}^{(V_n)}\right) = q \cdot P\left(\theta_{V_n} \mid Z_{-n}^{(V_n)}, Z_n^{(V_n)}\right) / P\left(Z_n^{(V_n)} \mid Z_{-n}^{(V_n)} \theta_{V_n}\right),$$

where q is a normalizing constant that makes the posterior sum to one.

In a second embodiment considering a continuous position determination rather than a discrete one, it is possible to partition the space of train's position into sub-partitions s=1, . . . , S. Each sub-partition is represented by a center $C_s$. To make the update and retrieve of posterior possible, it can be stated that if the train position $T_n$ is in sub-partition s, the likelihood p $$\left(Z_n^{(V_n)} \mid Z_{-n}^{(V_n)}, \theta_{V_n}\right)$$

can be approximated by replacing $T_n$ by $C_s$. The likelihood then becomes $$P\left(Z_n^{(V_n)} \mid Z_{-n}^{(V_n)}, \theta_{V_n}\right) = A\exp\left(-B\left(\sum_n c_n \log(\theta - T_n) - h'\right)^2\right) \approx A\exp\left(-B\left(\sum_n c_n \log(\theta - C_s^n) - h'\right)^2\right)$$

$$C_s^i$$

is determined by $$C_s^n = \underset{C_s}{\operatorname{argmin}} |T_n - C_s|.$$

Since the centres of sub-partitions are deterministic, the approximated likelihood can be expressed as $$p\left(Z_n^{(V_n)} \mid Z_{-n}^{(V_n)}, \theta_{V_n}\right) \approx A \exp\left(-B\left(\sum_s w_s \log(\theta - C_s) - h'\right)^2\right).$$

The base distribution $G_0$ in this case can be proposed in the form of:

$$G_0 = A_0 \exp\left(-B_0\left(\sum_s w_s^0 \log(\theta - C_s) - h_0'\right)^2\right).$$

In the simplest case, $G_0$ can be uniform, therefore $$w_s^0 = 0$$

for any s, $$h_0' = 0,$$

$\forall B_0$, and $A_0$ is the normalizing constant that makes $G_0$ sum to one. The term $(\Sigma_s w_s \log(\theta - C_s) - h')^2$ can be developed as follows $$\left(\sum_s w_s \log(\theta - C_s) - h'\right)^2 = d^T W_1 d + w_2 d + h'^2$$

where $d = (\log\|\theta - C_1\|, \ldots, \log\|\theta - C_S\|)$, $w_1 = (w_1, \ldots, w_S)^T * (w_1, \ldots, w_S)$, $$w_2 = 2 * (w_1, \ldots, w_S) * h'$$

In this logic, the posterior takes the same form as the approximated $$(Z_n^{(V_n)} \mid Z_{-n}^{(V_n)}, \theta_{V_n}).$$

The update and retrieve of posterior can be done as follows:

Update:

$$W_1^{new} = W_1^{old} + W_1,\ w_2^{new} = w_2^{old} + w_2 h'^{(new)} = h'^{(old)} + h'$$

Retrieve:

$$W_1^{new} = W_1^{old} - W_1,\ w_2^{new} = w_2^{old} - w_2,\ h'^{(new)} = h'^{(old)} - h'$$

Figure 10:
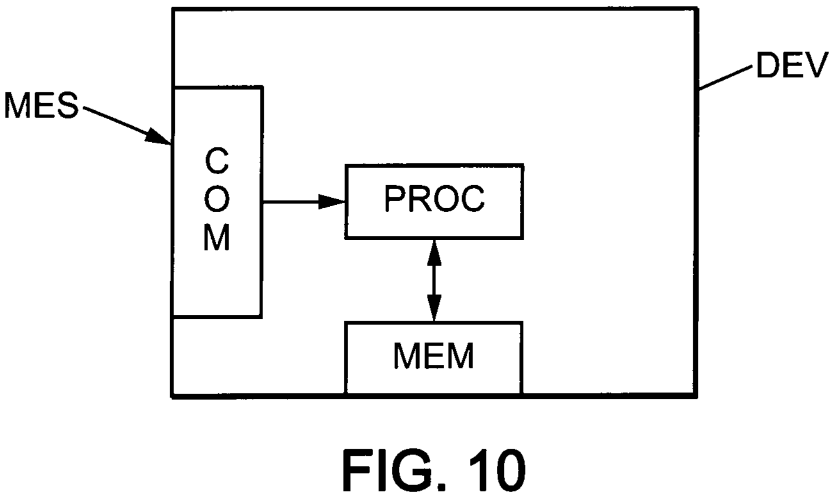
FIG. 10 shows an example of embodiment of a device for performing the method presented above.

FIG. 10 shows a device for implementing the method presented above, and comprising typically a processing circuit including a memory MEM storing data including data of computer program instructions for performing the method presented above when executed by a processor, as well as such a processor PROC, and an interface communication COM for receiving notably radiofrequency measurements.

The device can be embarked in the train and be responsible to identify the interferers, then feed the information back to a distant server. Besides, radiofrequency measurements can be performed by a module embarked in the train, while such measurement data are transmitted along with the train geolocation data to a distant server operating the steps of the method presented for example in the embodiment of FIG. 8. Therefore, the device to perform such a method can be embarked in the train or can be alternatively a remote server.

The device does not need to feed back the information for every step of the algorithm, i.e. each time the data of sources change. Instead, a metric can be defined such that the device decides when performing any feedback of the interfering sources. Indeed, the posterior probability of each source's position is updated progressively during the algorithm. The decision of doing the feedback should involve the evolution of posterior. One can state that once the posterior stays stable, the feedback may be proceeded. The feedback decision is taken once the evolution reaches a value which is small enough. That is to say:

When the estimation of considered source is converged (step S10), actions to take can be:
- Feeding the posterior for example back to a server;
- Keeping the source in consideration for source separation.

When the source is out of vision of the train, there is no longer any observation that is to be added to the source and the action to take can be:
- Feeding the posterior back to the server;
- Withdraw the source from the consideration of source separation.

In case of discretization, the posterior can actually be a grid of probability for discrete. By defining $$\Omega_k^{new},$$

and $$\Omega_k^{old}$$

the grids of this probability after and before each update (if any), respectively, the evolution of posterior are then defined as follows $$\xi = \|\Omega_k^{new} - \Omega_k^{old}\|$$

In the "continuous" case, the posterior is approximated by a continuous function. By defining $$H_k^{new}(\theta_k)$$

and $$H_k^{old}(\theta_k)$$

are the approximate posterior of source k after and before each update (if any), respectively, the evolution of posterior can be defined as:

$$\xi = \int |H_k^{new}(\theta_k) - H_k^{old}(\theta_k)| d\theta_k$$

The invention claimed is:

1. A computer implemented method for estimating interferers of a radiofrequency system embarked in a moving vehicle, the method comprising:

obtaining a trajectory of the moving vehicle at each time n, with a non-overlapping condition between the interferers considered as K independent active sources of interference having respective positions $\theta=[\theta_1, \ldots, \theta_k, \ldots, \theta_K]$, obtaining observations $Z_n$ corresponding to measurement, measured by an interface of the radiofrequency system in the moving vehicle, of interference from time instant 1 to N, and building an observation vector $Z=[Z_1, \ldots, Z_n, \ldots, Z_N]$, defining a latent variable $V_n$ indicating which source is activated at moment n, to build a vector of latent variables $V=[V_1, \ldots, V_n, \ldots, V_N]$, and implementing a Dirichlet process involving a Gibbs sampling with a Markov chain defined by vector $V=[V_1, \ldots, V_n, \ldots, V_N]$, the sampling as follows, being repeated until convergence:

for n=1, . . . , N, if the observation $Z_n$ is already associated to a source, remove observation $Z_n$ from its current associated source corresponding to latent variable $V_n$, and retrieve a position posterior of this source as the observation $Z_n$ is no longer belonging to this source, draw a new value of latent variable $V_n$, based on a conditional probability $P(V_n=k|V_{-n}, Z_{-n}, Z_n)$ depending on whether a source k pre-existed or not, Associate the observation $Z_n$ to the source corresponding to latent variable $V_n$, and update the posterior distribution of the position for the source corresponding to latent variable $V_n$, and, upon convergence of the algorithm, operating thereby:

a separation of interfering sources into K independent measurement sets related respectively to the K interfering sources, and an estimation of each source position with the interfering sources thus separated.

2. The method of claim 1, wherein a probability is evaluated to identify which source an observation $Z_n$ belongs to, said probability being given by:

$$P(V_n|V_{-n}, Z_{-n}, Z_n) \propto P(Z_n|V_{-n}, Z_{-n}, V_n)P(V_n|V_{-n}) = P(V_n|V_{-n}) \int p\left(z_n^{(V_n)} \middle| Z_{-n}^{(V_n)}, \theta_{V_n}\right) \cdot p\left(\theta_{V_n} \middle| Z_{-n}^{(V_n)}\right) d\theta_{V_n}$$

where $(\ )_{-n}$ refers to an index other than n, a probability $$p\left(Z_n^{(V_n)} \middle| Z_{-n}^{(V_n)}, \theta_{V_n}\right)$$

being a conditional probability of an observation $Z_n$ to be associated to the source corresponding to latent variable $V_n$, given other measurement $Z_{-n}$ already associated to this source.

3. The method of claim 2, wherein the posterior distribution of the position is updated progressively to estimate the source's position by implementing:

P(θ_(V_n)|Z_(−n)^((V_n)), Z_n^((V_n))) = (P(Z_n^((V_N))|Z_(−n)^((V_n)), θ_(V_n))P(θ_k ⊣ |Z_(−n)^((V_N)))) /(P(Z_n^((V_n))|Z_(−n)^((V_n))))

where $(\ )_{-n}$ refers to an index other than n.

4. The method of claim 3, wherein the probability $$p\left(Z_n^{(V_n)} \middle| Z_{-n}^{(V_n)}, \theta_{V_n}\right)$$

is expressed as:

$$p\left(Z_n^{(V_n)} \middle| Z_{-n}^{(V_n)}, \theta_{V_n}\right) = \frac{1}{\sqrt{2\pi {\sigma_{(n|-n)}^{(V_n)}}^2}} e - \frac{\left(z_n - \mu_{(n|-n)}^{(V_n)}\right)^2}{2{\sigma_{(n|-n)}^{(V_n)}}^2}.$$

5. The method of claim 4, wherein the terms $$\mu_{(n|-n)}^{(V_n)} \text{ and } \sigma_{(n|-n)}^{(V_n)}$$

are calculated as follows:

$$\begin{cases} \mu_{n|-n}^{(V_n)} = \mu_n^{(V_n)} + \sum_{n|-n}^{(V_n)} {\sum_{-n}^{(V_n)}}^{-1} \left(Z_{-n}^{(V_n)} - \mu_{-n}^{(V_n)}\right) \\ {\sigma_{n|-n}^{(V_n)}}^2 = \sigma^2 - \sum_{n|-n}^{(V_n)} {\sum_{-n}^{(V_n)}}^{-1} \sum_{-n|n}^{(V_n)} \end{cases},$$

where:

$$\mu_n^{(V_n)}$$

denotes a mean in a gaussian distribution for the observation $Z_n$, and expressed as $$\mu_n^{(V_n)} = a + b\log\|T_n - \theta_{V_n}\|$$

$$\sum_{(n|-n)}^{(V_n)}$$

denotes a correlation matrix between observation n and the other observation than n of source $V_n$, $$\sum_{-n}^{(V_n)}$$

denotes an auto-correlation matrix of observations other than n of source $V_n$, $$\mu_{-n}^{(V_n)}$$

denotes the mean at observations other than n of source $V_n$, $$\sum_{(-n|n)}^{(V_n)}$$

denotes the correlation matrix between observations other than n and observation n of source $V_n$.

6. The method according to claim 2, wherein the conditional probability $p(V_n=k|V_{-n})$ is given by:

$$p(V_n = k|V_{-n}) = \frac{N_k + \frac{\alpha}{K}}{N - 1 + \alpha}$$

where $N_k$ is a number of observations associated to a source corresponding to $V_n$, N is a total number of observations, a being a concentration parameter.

7. The method of claim 6, wherein the number of possible interferers K is unknown and:

the conditional probability for an observation to belong to a pre-existing source k is given by:

$$p(V_n = k|V_{-n}) = \frac{N_k}{N - 1 + a}$$

and the conditional probability for an observation to belong to a new source k' is given by:

$$p(V_n = k'|V_{-n}) = \frac{\alpha}{N - 1 + a}.$$

8. The method of claim 2, wherein the conditional probability equals to:

$$b\frac{N_k}{N-1+\alpha}\int p\left(Z_n^{(k)} \mid \{Z\}_{-n}^{(k)}, \theta_k\right)\cdot p\left(\theta_k \mid Z_{-n}^{(k)}\right)d\theta_k,$$

for an existing source k, or to $$b\frac{\alpha}{N-1+\alpha}\int p\left(Z_n \mid \theta\right)\cdot G_0(\theta)d\theta,$$

for a new source, where b is an appropriate normalizing constant making the above given probabilities sum to one.

9. The method according to claim 1, wherein the Dirichlet process involves a Dirichlet mixture model defined as:

$$\begin{cases} Z_n \mid V_n, \theta \sim N\left(\mu_n^{(V_n)}, \sigma_n^{2(V_n)}\right) @ V_n \sim \text{Discrete}(p_1, \ldots, p_K) \\ p \sim Dirichlet\left(\alpha/K\right) \\ \theta_k \sim G_0 \end{cases}$$

Where $G_0$ is a base distribution of position of a source.

10. The method according to claim 1, comprising further an estimation of a likelihood p $$p\left(Z_n^{(V_n)} \mid \{Z\}_{-n}^{(V_n)}, \theta_{V_n}\right),$$

as a function of a mobile vehicle position $T_n$, given by:

$$p\left(Z_n^{(V_n)} \mid \{Z\}_{-n}^{(V_n)}, \theta_{V_n}\right) = A\cdot\exp\left(-B\left(\sum_n c_n \log(\theta - T_n) - h'\right)^2\right).$$

11. The method according to claim 10, wherein position $\theta$ is discretized into discrete values in a discrete space $\Omega_\theta$, each value of position $\theta$ in said discrete space being associated with a probability.

12. The method according to claim 10, wherein a continuous position determination is performed by partitioning a space around the mobile vehicle position into sub-partitions s=1, . . . , S, each sub-partition being represented by a center $C_s$, the mobile vehicle position $T_n$ being in sub-partition s, and the likelihood being given by:

$$p\left(Z_n^{(V_n)} \mid \{Z\}_{-n}^{(V_n)}, \theta_{V_n}\right) = A\ \exp\left(-B\left(\sum_n c_n \log(\theta - T_n) - h'\right)^2\right) \approx A\ \exp\left(-B\left(\sum_s w_s \log(\theta - C_s^n) - h'\right)^2\right)$$

Where $$C_s^i$$

is determined by $$C_s^n = \underset{C_s}{\operatorname{argmin}}\left(\left\|\{T\}_n - C_s\right\|\right),$$

And a base distribution $G_0$ is given by $$G_0(\theta) = A_0 \exp\left(-B_0\left(\sum_s w_s^0 \log(\theta - C_s) - h_0'\right)^2\right).$$

13. Computer program comprising instructions for performing the method according to claim 1 when such instructions are executed by a processing circuit.

14. Device comprising a processing circuit configured to implement the method according to claim 1.

* * * * *